United States Patent [19]

Shin et al.

[11] Patent Number: 5,150,214

[45] Date of Patent: Sep. 22, 1992

[54] METHOD AND CIRCUIT FOR CORRECTION OF HORIZONTAL EDGES

[75] Inventors: Yun-Bok Shin; Joung-Sang Lee, both of Suwon, Rep. of Korea

[73] Assignee: SamSung Electronics Co., Ltd., Suweon, Rep. of Korea

[21] Appl. No.: 764,968

[22] Filed: Sep. 25, 1991

Related U.S. Application Data

[63] Continuation of Ser. No. 559,262, Jul. 27, 1990, abandoned.

[30] Foreign Application Priority Data

Jul. 29, 1989 [KR] Rep. of Korea ............... 1989-10792

[51] Int. Cl.$^5$ ............................................. H04N 5/208
[52] U.S. Cl. ..................................... 358/166; 358/162
[58] Field of Search ................... 358/37, 39, 162, 166, 358/174

[56] References Cited

U.S. PATENT DOCUMENTS

| | | | |
|---|---|---|---|
| 4,414,564 | 11/1983 | Hitchcock | 358/166 |
| 4,701,793 | 10/1987 | den Hollander et al. | 358/166 X |
| 4,789,893 | 12/1988 | Weston | 358/166 X |
| 4,825,297 | 4/1987 | Fuchsberger et al. | 358/37 X |
| 4,849,826 | 7/1989 | Ohta | 358/166 |

FOREIGN PATENT DOCUMENTS

| | | |
|---|---|---|
| 61-88665 | 5/1986 | Japan . |
| 61-88667 | 5/1986 | Japan . |
| 61-88669 | 5/1986 | Japan . |
| 62-49784 | 3/1987 | Japan . |
| 63-232756 | 9/1988 | Japan . |

Primary Examiner—James J. Groody
Assistant Examiner—Mark R. Powell
Attorney, Agent, or Firm—Robert E. Bushnell

[57] ABSTRACT

A circuit for correcting horizontal edges in a digital image signal processing system, includes: three filtering circuits for filtering an input luminance signal to obtain a low frequency component, a medium frequency component and a high frequency component, respectively; three controller circuits for controlling gain of the low frequency component signal, the medium frequency component signal and the high frequency component signal on the basis of three corresponding control signals to produce three respective frequency signals and three mixing circuits for mixing the input luminance signal with the resepctive frequency signals to thereby produce an output luminance signal corrected in horizontal edges.

21 Claims, 1 Drawing Sheet

METHOD AND CIRCUIT FOR CORRECTION OF HORIZONTAL EDGES

This is a continuation of application Ser. No. 07/559,262 filed on Jul. 27, 1990 now abandoned.

BACKGROUND OF THE INVENTION

The present invention relates to a method and circuit for correction of horizontal edges in a digital image information processing system. More particularly, the invention relates to a method and circuit which corrects horizontal edges by emphasizing the high frequency component of luminance and attenuating the band of color signal.

The correction of a horizontal edges in a High Definition digital Television (HDTV) or in a Video Tape Recorder (VTR) is to emphasize the horizontal edges. Referring to FIG. 1, heretofor, for the correction of horizontal edges, the signals of corresponding bands are respectively extracted by using a band pass filter of 2.4 MHz and a band pass filter of 3.58 MHz from a luminance signal source, and the signal of each band is multiplied by a coefficient for emphasis or attenuation and these two signals are composed and then the composed signal is again composed with the luminance signal source, as illustrated in FIG. 1.

However, such a conventional device as stated above is defective in that the high frequency component signal of luminance is not corrected and a circuit for high frequency component correction is indispensable when it is considered that the signal for HDTV in the future can load image information even on the high frequency component of luminance.

SUMMARY OF THE INVENTION

An object of the present invention is to detect the luminance signal of a corresponding band by using a low pass filter, medium pass filter and high pass filter Another object of the present invention is to control a gain of each band pass filter.

Still another object of the present invention is to control each gain of low, medium and high frequency by using each gain controller.

Further another object of the present invention is to provide a method and circuit for correction of horizontal edges by making the horizontal edges freely controllable by the gain controller of each band.

To achieve the objects of the present invention, the present invention comprises: a first filter for filtering low frequency components of an input luminance signal; a second filter for filtering medium frequency components of the input luminance signal; a third filter for filtering high frequency components of the input luminance signal; a first gain controller, coupled to the first filter, for controlling gain of the luminance signal from the first filter according to a first control signal; a second gain controller, coupled to the second filter, for controlling gain of the luminance signal from the second filter according to a second control signal; a third gain controller, coupled to the third filter, for controlling gain of the luminance signal from the third filter according to a third control signal; a first mixer for mixing the input luminance signal with an output of the first gain controller to obtain a first output signal; a second mixer for mixing an output of the second gain controller with an output of the third gain controller to obtain a second output signal; and a third mixer for mixing the first output signal with the second output signal to obtain a final output signal.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 1:
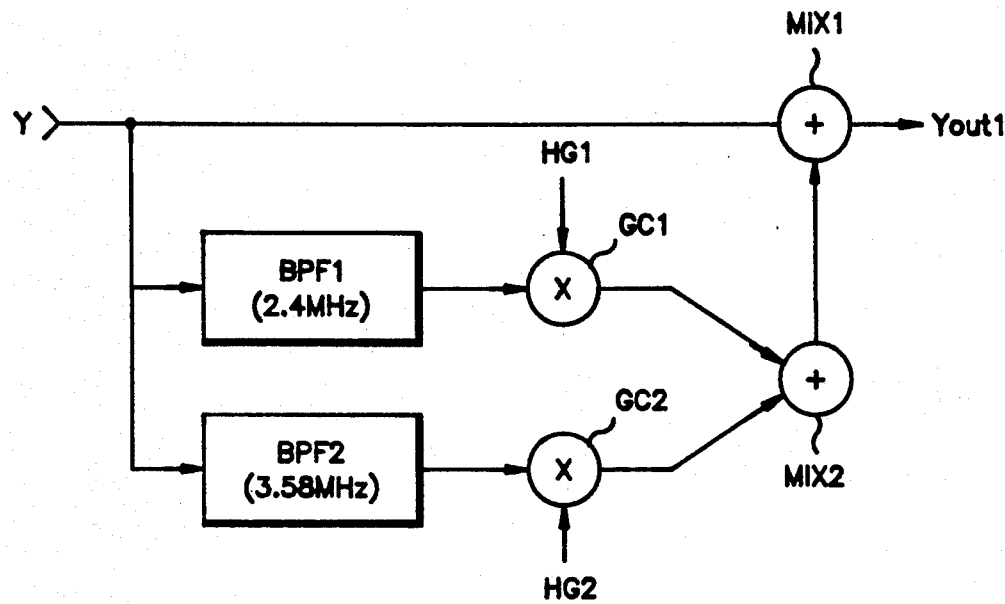
FIG. 1 is a conventional horizontal edge correction circuit diagram.
Figure 2:
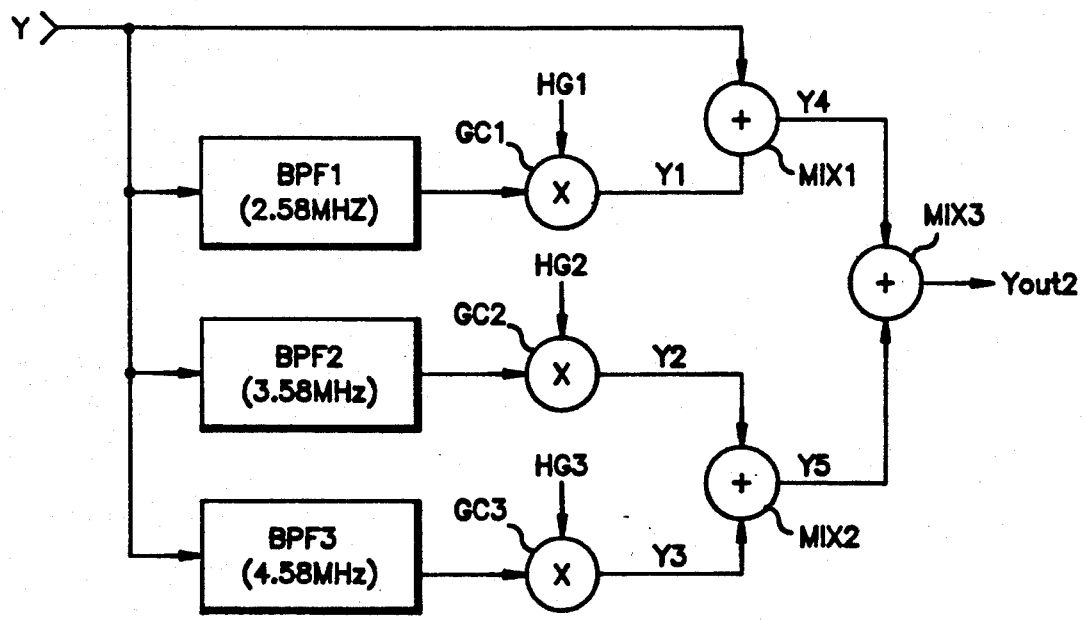
FIG. 2 is a horizontal edge correction circuit diagram according to the present invention.

Referring to FIG. 2, a first band pass filter (BPF1) is to filter a low frequency component signal from an input luminance signal(Y). A second band pass filter (BPF2) is to filter a medium frequency component signal from the input luminance signal(Y). A third band pass filter (BPF3) is to filter a high frequency component signal from the input luminance signal(Y). A first gain controller (GC1) is to control a gain of an output from the first band pass filter according to a first prescribed gain signal (HG1). A second gain controller (GC2) is to control a gain of an output from the second band pass filter according to a second prescribed gain signal (HG2). A third gain controller (GC3) is to control a gain of an output from the third band pass filter according to a third prescribed gain signal (HG3). A first signal mixer (MIX1) is to mix the input luminance signal(Y) with the first luminance signal(Y1) from the first gain controller (GC1) so as to obtain a first output signal. A second signal mixer (MIX2) is to mix the second luminance signal(Y2) from the second gain controller (GC2) with the third luminance signal(Y3) from the third gain controller (GC3). A third signal mixer (MIX3) is to mix the first output signal with the second output signal so as to provide a final output signal (Yout2).

In an image processing system like a HDTV, a portion of horizontal edges is corrected by emphasizing a high frequency component and attenuating a color signal band. The correcting circuit is formed as illustrated in FIG. 2 and operates as follows.

A luminance signal which has 2.58 MHz as its peak value is extracted through the first band pass filter(BPF1) from the original luminance signal, and the first luminance signal(Y1) is obtained by multiplying the extracted luminance signal by the first prescribed value of gain(HG1) in the first gain controller(GC1).

The first luminance signal(Y1) is added to the original luminance signal(Y) by the first signal mixer(MIX1) and the first mixed luminance signal (Y4) is thereby produced. At the same time, a luminance signal which has 3.58 MHz as its peak value is extracted through the second band pass filter(BPF2) and the second luminance signal(Y2) is obtained by multiplying it by the second prescribed value of gain(HG2) in the second gain controller(GC2).

Also, a luminance signal which has 4.58 MHz as its peak value is extracted in the third band pass filter(BPF3) and then the third luminance signal(Y3) is produced by multiplying it by the third prescribed value of gain(HG3) in the third gain controller(GC3). Here, each value of gain is determined as an increasing or decreasing coefficient by the control of its user or can be controlled by providing a reference value table in the microcomputer. The second mixed luminance signal(Y5) is obtained by the mixing of the second and third luminance signals(Y2,Y3) in the second signal mixer(MIX2) and the luminance signal(Yout2) whose horizontal edges are corrected is obtained by the addition of the first mixed luminance signal(Y4) to the second mixed luminance signal(Y5).

The luminance signal(Yout2) whose horizontal edges are corrected by doing addition as mentioned above can be formularized like a formula(1) given below.

$$Yout2 = (Y+Y1) + (Y2+Y3) = Y4 + Y5 \quad (1)$$

Thus, it has the advantage of improving resolving power by enabling horizontal edges to be freely controlled and enabling not only medium and low but also high frequency component luminance signals to be corrected by controlling each gain of the band pass filters in each band.

While the invention has been particularly shown and described with reference to a preferred embodiment, it will be understood by those skilled in the art that modifications in detail may be made without departing from the spirit and scope of the invention.

What is claimed is:

1. A circuit for correcting horizontal edges in a digital image signal processing system, comprising:
    first filtering means for filtering low frequency components of an input luminance signal;
    second filtering means for filtering medium frequency components of said input luminance signal;
    third filtering means for filtering high frequency components of said input luminance signal;
    first gain controller means, coupled to said first filtering mean, for controlling gain of the luminance signal from said first filtering means on the basis of a first control signal;
    second gain controller means, coupled to said second filtering means, for controlling gain of the luminance signal from said second filtering means on the basis of a second control signal;
    third gain controller means, coupled to the third filtering means, for controlling gain of the luminance signal from the third filtering means on the basis of a third control signal;
    first mixer means for mixing said input luminance signal with an output of said first gain controller means to obtain a first output signal;
    second mixer means for mixing an output of said second gain controller means with an output of said third gain controller means to obtain a second output signal; and
    third mixer means for mixing said first output signal with said second output signal to obtain a final output signal.

2. A method for correcting horizontal edges in a digital image signal processing system, comprising the steps of:
    filtering an input luminance signal to obtain a low frequency component signal, a medium frequency component signal and a high frequency component signal;
    controlling a gain of each of said low frequency component signal, said medium frequency component signal and said high frequency component signal on the basis of respective control signals; and
    mixing said input luminance signal with said gain controlled low frequency component signal, medium frequency component signal and high frequency component signals to thereby produce an output luminance signal corrected in horizontal edges.

3. The method according to claim 2, wherein said mixing step comprises the steps of:
    mixing said input luminance signal with said gain controlled low frequency component signal to obtain a first output signal;
    mixing said gain controlled medium frequency component signal with said gain controlled high frequency component signal to obtain a second output signal;
    mixing said first output signal with said second output signal to thereby produce said output luminance signal corrected in horizonal edges.

4. The circuit as claimed in claim 1, wherein:
    said first filtering means comprises a first band pass filter;
    said second filtering means comprises a second band pass filter; and
    said third filtering means comprises a third band pass filter.

5. The circuit as claimed in claim 4, wherein said first band pass filter has a peak value of 2.58 MHz.

6. The circuit as claimed in claim 4, wherein said second band pass filter has a peak value of 3.58 MHZ.

7. The circuit as claimed in claim 4, wherein said third band pass filter has a peak value of 4.58 MHz.

8. The circuit as claimed in claim 1, further comprised of said first gain controller means said second gain controller means, and said third gain controller means varying said gain respectively, of said luminance signal from said first filtering means, said luminance signal from said second filtering means, and said luminance signal from said third filtering means.

9. The circuit as claimed in claim 1, wherein said first, second and third mixer means respectively comprise a first adder, a second adder and a third adder.

10. A circuit for correcting horizontal edges in a digital image signal processing system, comprising:
    first means for filtering an input luminance signal to produce a low frequency component signal, a medium frequency component signal and a high frequency component signal;
    second means for receiving said low frequency component signal, medium frequency component signal and high frequency component signal, and for controlling a gain of each of said low frequency component signal, medium frequency component signal and high frequency component signal in response to corresponding, respectively received, gain control signals; and
    third means for mixing said input luminance signal and said gain controlled low frequency component signal, medium frequency component signal and high frequency component signal to produce a mixed output luminance signal.

11. The circuit as set forth in claim 10, wherein said first means comprises:
    first, second and third band pass filters for passing said low frequency component signal, medium frequency component signal and high frequency component signal, respectively.

12. The circuit as set forth in claim 10, wherein said second means comprises:
    a first gain controller responsive to a first gain control signal for controlling the gain of said low frequency component signal to produce said gain controlled low frequency component signal;

a second gain controller responsive to a second gain control signal for controlling the gain of said medium frequency component signal to produce said gain controlled medium frequency component signal; and a third gain controller responsive to a third gain control signal for controlling the gain of said high frequency component signal to produce said gain controlled high frequency component signal.

13. The circuit as set forth in claim 11, wherein said second means comprises:

a first gain controller responsive to a first gain control signal for controlling the gain of said low frequency component signal to produce said gain controlled low frequency component signal;

a second gain controller responsive to a second gain control signal for controlling the gain of said medium frequency component signal to produce said gain controlled medium frequency component signal; and a third gain controller responsive to a third gain control signal for controlling the gain of said high frequency component signal to produce said gain controlled high frequency component signal.

14. The circuit as set forth in claim 10, wherein said third means comprises:

a first mixer for receiving said input luminance signal and said gain controlled low frequency component signal and for producing a first mixed signal;

a second mixer for receiving said gain controlled medium frequency component signal and said gain controlled high frequency component signal and for producing a second mixed signal; and a third mixer for receiving said first mixed signal and second mixed signal and for producing said mixed output luminance signal corrected in horizontal edges.

15. The circuit as set forth in claim 13, wherein said third means comprises:

a first mixer for receiving said input luminance signal and said gain controlled low frequency component signal, and for producing a first mixed signal;

a second mixer for receiving said gain controlled medium frequency component signal and said gain controlled high frequency component signal, and for producing a second mixed signal; and a third mixer for receiving said first mixed signal and second mixed signal and for producing said mixed output luminance signal.

16. The circuit as set forth in claim 11, wherein said first band pass filter has a peak value of 2.58 MHz, said second band pass filter has a peak value of 3.58MHZ and said third band pass filter has a peak value of 4.58 MHz.

17. The circuit as set forth in claim 15, wherein said first band pass filter has a peak value of 2.58 MHz, said second band pass filter has a peak value of 3.58MHZ and said third band pass filter has a peak value of 4.58 MHz.

18. The circuit as set forth in claim 12, wherein said first, second and third control signals are variable.

19. The circuit as set forth in claim 17, wherein said first, second and third control signals are variable.

20. The circuit of claim 10, further comprised of said third means:

providing a first mixed signal by mixing said input luminance signal and said gain controlled low frequency component signal;

providing a second mixed signal by mixing said gain controlled medium frequency component signal and said gain controlled high frequency component signal; and generating said mixed output luminance signal by mixing said first mixed signal and said second mixed signal.

21. The circuit of claim 10, wherein said second means provides a plurality of gain controlled signals comprised of said gain controlled low frequency component signal, said gain controlled medium frequency component signal, and said gain controlled high frequency component signal, said third means further comprised of:

first mixing means for providing a first mixed signal by mixing said input luminance signal and a first one of said gain controlled signals;

second mixing means for providing a second mixed signal by mixing a second one of said gain controlled signals and a third one of said gain controlled signals; and third mixing means for providing said output luminance signal by mixing said first mixed signal and said second mixed signal.

* * * * *

UNITED STATES PATENT AND TRADEMARK OFFICE
CERTIFICATE OF CORRECTION

PATENT NO. : 5,150,214
DATED : September 22, 1992
INVENTOR(S) : Yun- Bok Shin, et al.

It is certified that error appears in the above-indentified patent and that said Letters Patent is hereby corrected as shown below:

Column 1,

Line 15    before "color", insert ---a---;

Line 28    after "such" change "a conventional device" to ---conventional art---:

Signed and Sealed this

First Day of October, 1996

Attest:

BRUCE LEHMAN

*Attesting Officer*    *Commissioner of Patents and Trademarks*